Feb. 23, 1960 G. A. HEMPEL 2,925,991
SPOUTED GATE VALVE
Filed June 13, 1955
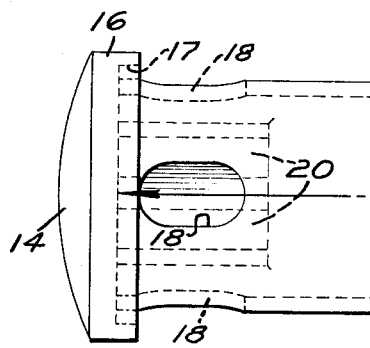
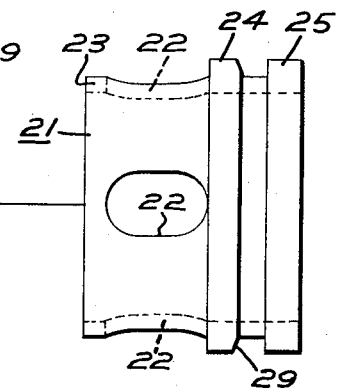
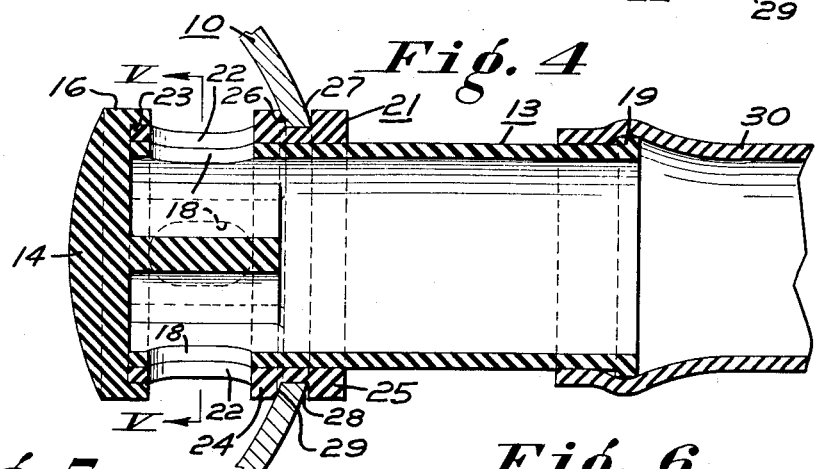
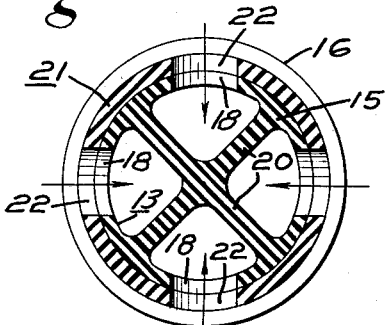
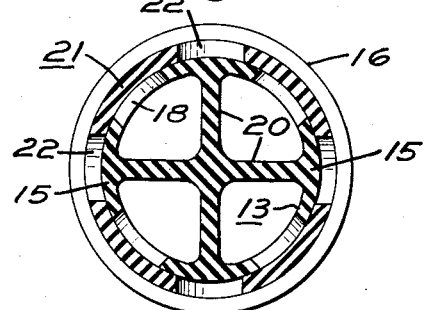
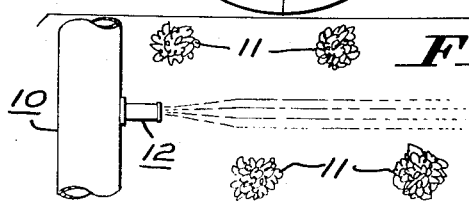
INVENTOR:
GUSTAV A. HEMPEL
BY
his Attorneys.

United States Patent Office 2,925,991
Patented Feb. 23, 1960

2,925,991

SPOUTED GATE VALVE

Gustav A. Hempel, Pittsburgh, Pa., assignor to McDowell Manufacturing Company, Pittsburgh, Pa., a corporation of Pennsylvania Application June 13, 1955, Serial No. 514,855

5 Claims. (Cl. 251—145)

This invention relates to a gate valve and particularly to one in which the gate may act also as a spout and as a fine adjustable control for supplying liquids from a housing or pipe member such as may be used in irrigating crop rows.

In irrigating crop rows, a length of pipe is laid transversely of a series of longitudinally-extending row plantings which have a suitable transverse spacing with respect to each other. The tubing or pipe line is provided with fluid feed or discharge openings, usually of about 40 inch spacing, in alignment with the spacing between the crop rows to supply irrigating water therealong. Means is provided, such as a valve unit, for controlling and shutting off fluid flow from each of the discharge openings that are usually horizontally positioned in the side wall of the pipe line. In this manner, the amount of water supplied may be proportioned to actual requirements from the standpoint of the nature of the crop, the depth of its roots, and the like, and from the standpoint of the type and intensity of irrigating action desired.

Valve units heretofore used for this purpose have not been entirely satisfactory. In the first place, difficulty has been encountered in inserting and mounting the valve units through openings in the side wall of a tubing housing member or pipe section. In the second place, valve units heretofore used have been of a type such that they are subject to damage when the pipe section is transported or removed from one place to another. In the third place, difficulty has been encountered in fully shutting-off the valves and in operating them due to silt or dirt jamming.

In my Patent No. 2,693,203 which issued November 2, 1954, I have described and claimed a gated valve that entirely obviates the above difficulties. The gated valve of this patent may be stationed within a wall opening of a fluid carrying member between positions of minimum and maximum insertions. In the position of minimum insertion, the valve is shut. As the valve body is inserted farther into the fluid carrying member, a passageway along a side of the body enters the housing member and conducts fluid therefrom through the passageway and out the valve. Still further insertion of the valve increases the effective flow area of the passageway and therefore likewise increases the rate of fluid flow therethrough until substantially the position of maximum insertion is reached.

Although this valve is satisfactory for the purposes indicated, the fluid seal between the edges of the wall opening in the fluid-carrying housing member and the exterior of the valve intermediate the positions of minimum and maximum insertion has been found to be not as tight as the seal between such wall edges and the valve body at the extreme positions mentioned. Further, since the actual insertion and positioning of the valve body with respect to the wall opening is by hand, the control of the effective flow area of the passageway and the resultant control of the rate of fluid flow is necessarily relatively coarse. Additionally, the gated valve of my indicated patent is not readily connected to a hose exteriorly of the housing member as when it is desired to conduct fluid from the housing member for some distance prior to its distribution at a point of use.

The gated valve of my present invention similarly overcomes the difficulties met with the valves in use prior to my Patent No. 2,693,203 and, in addition, provides further advantages. My instant valve provides a tight fluid seal at all times with the wall opening in the fluid-carrying member and is capable of a much finer control on the rate of fluid flow. Moreover, a portion of the gate member is readily adapted for detachable connection to another conductor, such as a flexible hose, when it is desired to conduct the fluid for some distance away from the housing member.

In my instant gated valve, the valve body need not be moved longitudinally with respect to an open wall portion of a fluid-carrying member to adjust an effective flow area. Instead, such body is fixed with respect to longitudinal movement and a tubular member is mounted over the valve body for relative movement therewith to cover and uncover a side passageway or opening in the body. The cup-shaped body may also act as a spout.

In my copending applications, Serial Numbers 514,853 and 514,854, filed June 13, 1955, I have described and claimed two other forms of my improved gated valve. The instant valve differs from those of the copending applications in that the gate or sleeve forms a closed inner end of the valve body and has only relatively rotary movement with respect to a tubular member within which the sleeve fits. For example, in one form, the instant valve includes a cup-shaped body having an opening or passageway in one side and an external groove extending around the body. A collar fits over the body and has a side opening alignable transversely of the body with the opening thereof. The inner end of the collar engages the groove to effect relative rotation between the cup-shaped body and the collar to enable movement of the openings into and out of registry. Flexible means on the collar between its side opening and its outer end engages a periphery of an open wall portion of a fluid-carrying housing member to seal off fluid flow between such member and the collar. In the preferred form, the cup-shaped body extends outwardly beyond the outer end of the collar to act also as a spout.

The accompanying drawing illustrates a presently preferred embodiment wherein:

Figure 1 is a diagrammatic plan view of a crop row system illustrating how a valve of my invention may be employed;

Figures 2 and 3 are side elevations of the cup-shaped body and the collar, respectively, of the valve of Figure 1;

Figure 4 is a center, longitudinal section of the parts of Figures 2 and 3 when assembled and moved to a fully opened position;

Figure 5 is a section of Figure 4 on the line V—V; and

Figure 6 is a section similar to Figure 5 illustrating the parts in a fully closed position.

Referring to the drawing, my valve may be used with a fluid-carrying housing member shown in Figure 1 as a pipe 10. The pipe lines transversely of crop rows 11 with the instant valve generally shown at 12 extending preferably parallel to and between the rows to supply irrigating water.

The embodiment illustrated includes a cup-shaped body 13 formed from a relatively soft resilient material such as natural or synthetic rubber or from plastic. Or the body 13 may have its tubular part formed from metal and its closed end from one of the materials just mentioned. The body 13 functions, inter alia, as the gate of the valve and has a closed-off inner end 14 and a longitudinally extending side wall 15 terminating in an open outer end. The end 14 is preferably dome-shaped, as hereinafter described, and has a radially projecting flange 16 provided with a groove 17 that extends around the body 13 and faces toward the outer open end of that body. The wall 15 has radial openings or passageways 18 adjacent its inner end, and the open outer end has an outwardly projecting flange 19. Preferably, the body 13 has cross ribs 20 which extend radially across the inside of the body to connect the body portions between the openings 18 and thereby reinforce that end.

A tubular member or collar 21 makes a relatively snug fit over the body 13 and has opposed radial openings or passageways 22 which are alignable transversely of the body 13 with its passageways 18 when the collar 21 is inserted over the body 13 as shown in Figure 4. The inner end 23 of the collar fits within the groove 17.

A pair of spaced-apart resilient sealing rims 24 and 25 extend radially outwardly from the collar to engage inner and outer seating surfaces 26 and 27 about wall edges 28 of an open wall portion in the pipe 10 and thereby seal off fluid flow between the wall edges and the collar 21. As illustrated in Figure 4, the rims 24 and 25 grip the peripheral seating surfaces 26 and 27 with respect to the collar 21 at a point between the passageways 22 and the outer end of the collar. Preferably the inner sealing rim 24 has a side 29 shaped to conform with the configuration of the inner seating surface of the pipe 10.

The collar may also be made of rubber. Preferably, the cup-shaped body 13 is of a denser material than that composing the collar 21. For example, when the body 13 is rubber, it may have a durometer reading as high as 100 or higher, while the collar 21 may have a durometer reading approximately 60 to 70.

In practice, the cup-shaped body, preferably while free of the collar 21, is manually collapsed, if made of rubber or flexible plastic, and then inserted at an angle through the wall opening defined by the edges 28. The collar is then inserted over the outer end of the body 13 and squeezed and flexed until the rims 24 and 25 straddle the edges 28 as shown in Figure 4. The parts are next adjusted longitudinally until the inner end 23 of the collar fits within the groove 17 if it has not already done so. This fit is relatively tight but not sufficiently tight to bind and prevent relative rotation between the parts. The cup-shaped body is then turned relatively to the collar 21, if necessary, to position the parts as shown in Figure 6 and close the valve. When pressure is admitted to the pipe 10, the dome-shaped area of the closed end 14 provides a fluid pressure area that is greater than the transverse area of that end in a plane taken normal to the longitudinal axis of the body 13. The dome-shaped area is sensitive to fluid pressure because of its resiliency, and accordingly moves the inner sealing rim 24 into a fluid-tight seating engagement with the inner seating surface 26. In this manner, the dome-shaped end 14 and rim 24 cooperate to provide a fluid seal between the collar 21 and the pipe 10 in response to fluid pressure within the pipe. The tapered side 29 of rim 24 aids in this seal.

To open the valve, it is necessary only to rotate the cup-shaped body 13 until its passageways 18 at least partially register with the passageways 22. Because of the relative rotary movement between the collar 21 and the body 13, a very fine degree of control is possible on the effective flow area formed by the openings or passageways 18 and 22 as they move into registry. The body 13 in acting as a spout prevents the water from running back along the pipe and can be readily gripped to control the flow without wetting the user. To remove the valve from the pipe 10, the parts may be withdrawn in an order reversed to their assembly.

When it is desired to carry water issuing from the valve 12 a distance from the pipe 10, such as to a trench rather than to discharge it immediately adjacent the pipe, a flexible hose 30 leading to a desired point of use is readily attached to the open end of the body 13. Accordingly, this member now acts as a spout in addition to functioning as the gate of the valve. The flange 19 grips the hose 30 upon its attachment.

While the foregoing disclosure describes a presently preferred embodiment, it is understood that the invention may be practiced in other forms within the scope of the following claims.

I claim:
1. A gated valve to be inserted into operative engagement with wall edges of an open wall portion of a fluid-carrying housing member including a cup-shaped body of resilient material having an extending side wall closed off at one end and open at the other, said closed-off end being inwardly placed with respect to the wall edges, said side wall having an opening to admit fluid from the housing member therethrough, an annular portion projecting radially from said body having an axially-disposed groove formed therein, a collar of resilient material carried about the cup-shaped body in contact therewith having an opening aligned transversely of said body with the side opening thereof, the inner end of said collar with respect to the open wall portion engaging the groove for rotation of said collar with respect to said cup-shaped body to enable movement of the openings into and out of registry, and flexible sealing means integral with said collar and formed radially around the collar between its side opening and the outer end of said collar with respect to the open wall portion for flexible insertion past the wall edges into the housing member to compressibly seat against an inner surface of the open wall portion.

2. A valve as claimed in claim 1 wherein the flexible sealing rim about the collar is distorted into position behind the inner seating surface of the open wall portion and has a side shaped to conform with the configuration of the inner seating surface.

3. A valve as claimed in claim 1 wherein the cup-shaped body has a substantially radially-extending internal cross-member adjacent the opening to reinforce its inner end.

4. A gated valve to be operatively mounted in sealing engagement with wall edges of an open wall portion of a fluid-carrying housing member including a tubular body having a longitudinally-extending side wall, a closed off inner end, and an open outer end, said side wall having an opening to admit fluid from the housing member into the tubular body, said inner end having a radially outwardly projecting flange provided with an annular groove disposed axially toward the open outer end of the body, a collar of resilient material insertable over the cup-shaped body in contact therewith having a side opening alignable transversely of the body with the side wall opening thereof, the inner end of the collar with respect to the open wall portion being engageable within said groove for rotation of said collar with respect to said tubular body to enable movement of said openings into and out of registry, and resilient sealing means formed integral with said collar and projecting radially-outwardly from the collar between its side opening and the outer end of said collar for flexible insertion past the wall edges into the housing member to compressibly seat against an inner surface of the open wall portion in response to fluid pressure in the housing member.

5. A spouted gate valve to be distorted into an operatively-mounted engagement with wall edges of an open wall portion of a fluid-carrying housing member including a resilient tubular body having a longitudinally-extending side wall, a closed-off inner end, and an open outer end, said side wall having at least one passageway adjacent the closed off inner end to admit fluid from the housing member into the tubular body, said closed off inner end having a radially projecting flange provided with a groove extending around said body and directed toward the open outer end, a collar of resilient material insertable over the tubular body with a relatively snug fit having a side passageway alignable transversely of the tubular body with the passageway thereof, the inner end of said collar with respect to the open wall portion being received in the groove of said flange for rotation of said collar with respect to said tubular body to enable movement of said passageways into and out of registry, said tubular body extending outwardly beyond the outer end of the collar to act also as a spout, spaced-apart resilient sealing rims formed on the collar to project radially-outwardly between its passageway and the outer end thereof to engage between inner and outer seating surfaces about the open wall portion and seal off fluid flow between said portion and the collar.

References Cited in the file of this patent

UNITED STATES PATENTS

| | | |
|---|---|---|
| 149,050 | Massey | Mar. 31, 1874 |
| 225,298 | Newton | Mar. 9, 1880 |
| 876,483 | Myers | Jan. 14, 1908 |
| 1,760,946 | Hammerstein | June 3, 1930 |
| 2,513,272 | Bowen | July 4, 1950 |
| 2,693,203 | Hempel | Nov. 2, 1954 |
| 2,766,005 | Fischer | Oct. 9, 1956 |
| 2,771,904 | Sherman | Nov. 27, 1956 |

FOREIGN PATENTS

| | | |
|---|---|---|
| 13,984 | Great Britain | July 7, 1905 |